July 31, 1945.  A. F. MEYER ET AL  2,380,861
TRUCK BODY AND SUB-FRAME CONSTRUCTION
Filed Feb. 22, 1943  2 Sheets-Sheet 1
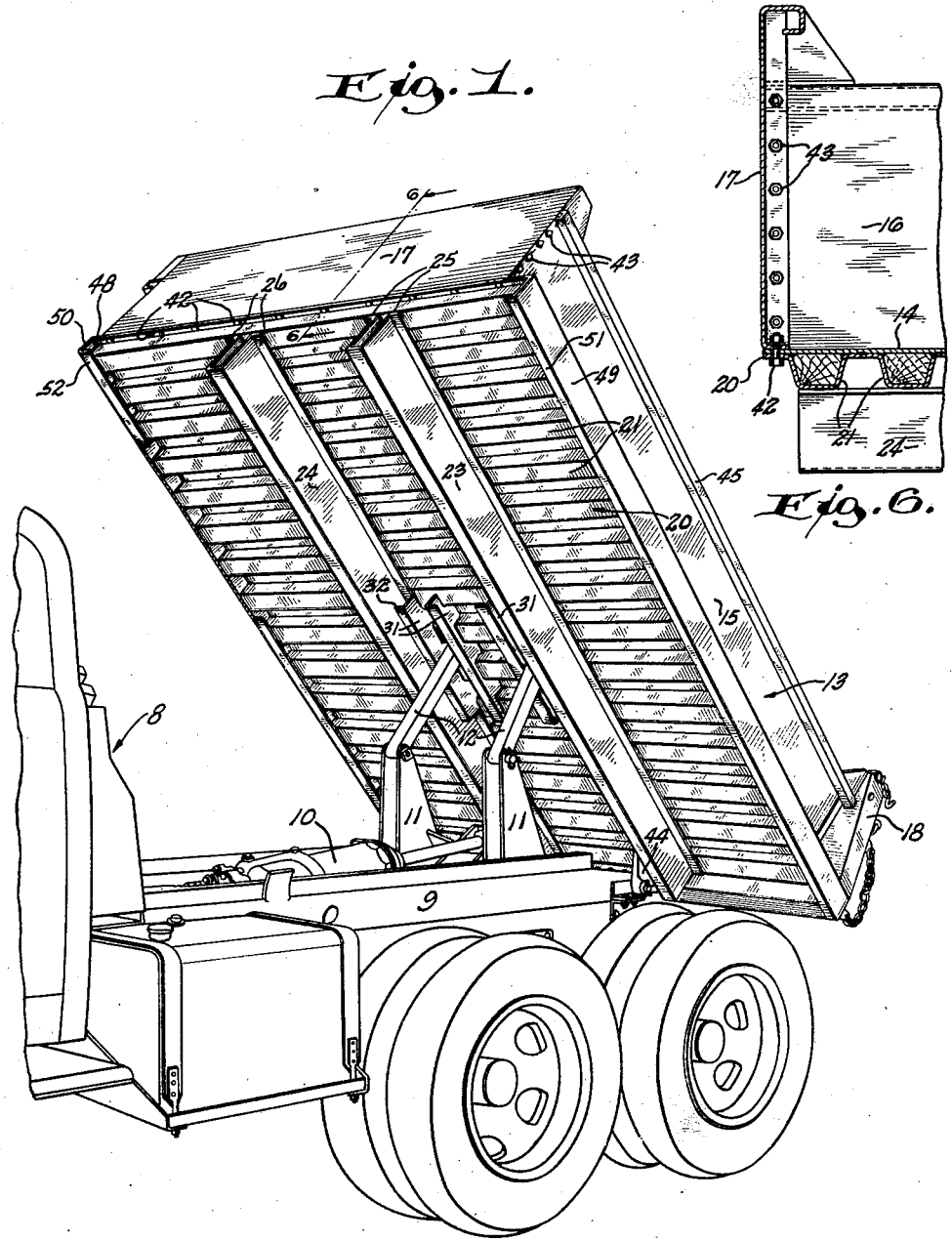
INVENTOR.
Arnold F. Meyer
Henry C. French
BY Morsell & Morsell
ATTORNEYS.

July 31, 1945.   A. F. MEYER ET AL   2,380,861
TRUCK BODY AND SUB-FRAME CONSTRUCTION
Filed Feb. 22, 1943   2 Sheets-Sheet 2
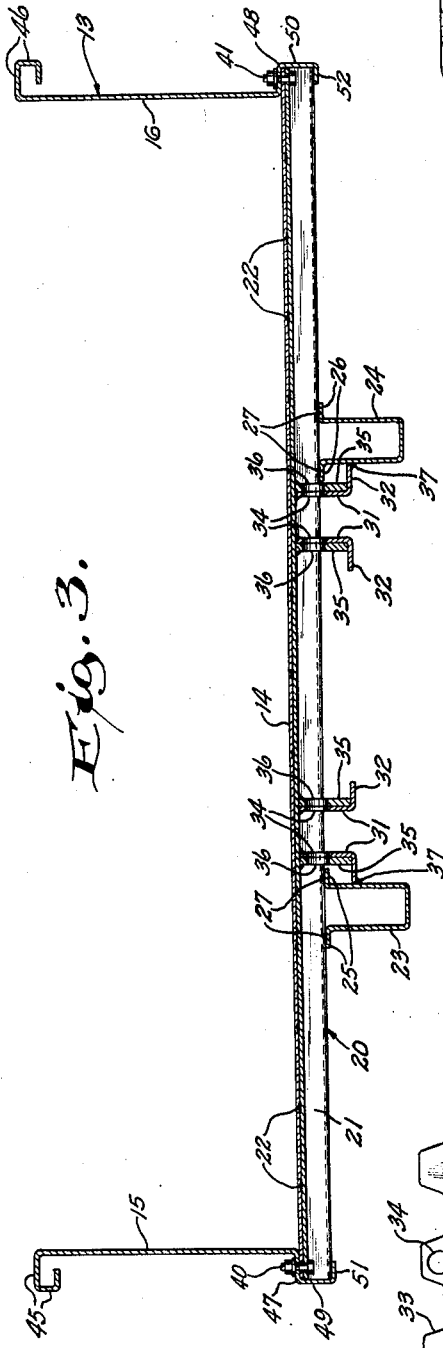
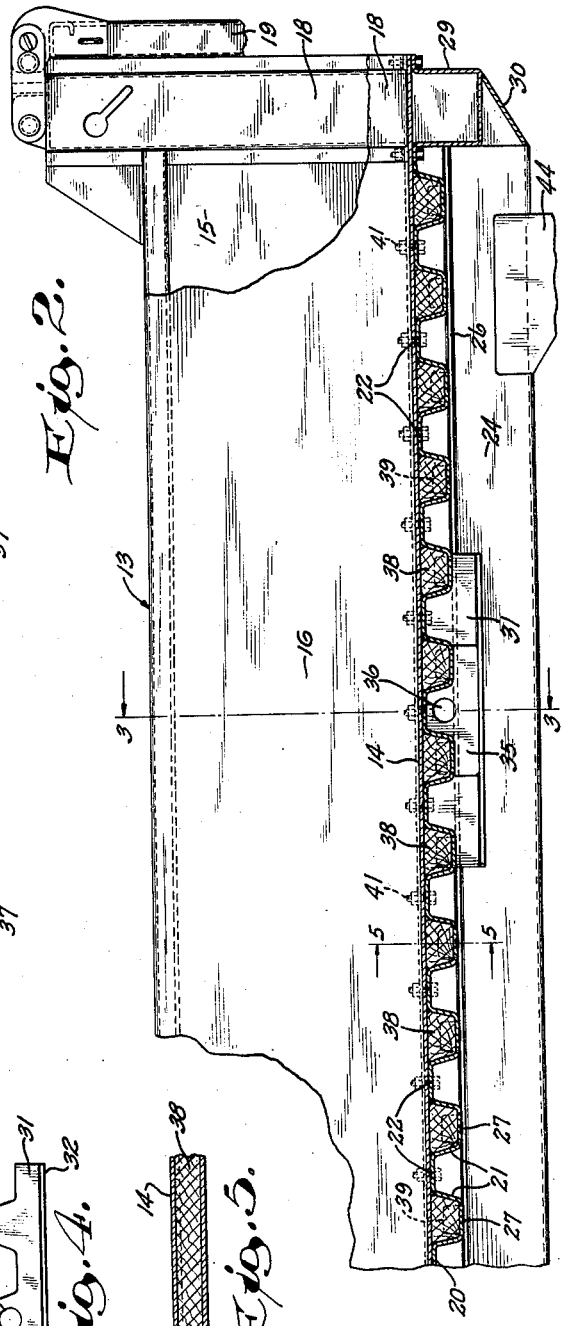
INVENTOR.
Arnold F. Meyer
Henry C. French
BY Morsell & Morsell
ATTORNEYS.

Patented July 31, 1945

2,380,861

UNITED STATES PATENT OFFICE 2,380,861

TRUCK BODY AND SUBFRAME CONSTRUCTION

Arnold F. Meyer, Pewaukee, and Henry C. French, Elm Grove, Wis., assignors to The Heil Co., Milwaukee, Wis., a corporation of Wisconsin Application February 22, 1943, Serial No. 476,660

9 Claims. (Cl. 296—28)

This invention relates to improvements in truck body and sub-frame constructions.

Heretofore, it has been common practice in the construction of a sub-frame mounted open truck body, to provide a two-section body floor with the edges meeting along the longitudinal median of the floor and with each floor portion having an integral upright side wall. The floor of the body was mounted on and reinforced by a plurality of relatively widely spaced cross channels which in turn rested on longitudinal channels or I-beams. Due to the wide spacing of the transverse members there was considerable opportunity for sagging of portions of the floor. While the body could be conveniently fabricated from sheet metal, it was common practice to use special prefabricated members for the cross channels and longitudinal channels or I-beams. The usual construction also required considerable arc welding.

It is a general object of the present invention to provide an improved truck body and sub-frame construction which may be fabricated entirely from sheet metal and which is nevertheless extremely strong and rigid and inexpensive to manufacture.

A further object of the present invention is to provide a construction of the class described wherein the body floor may be formed of relatively light gauge material and wherein said bottom is nevertheless so reinforced that the possibility of sagging is eliminated.

A further object of the invention is to provide a construction as above described which may be shipped in knocked down form, wherein the sides and forward end wall may be quickly bolted to the specially reinforced bottom, to produce a strong and rigid body assembly.

A more specific object of the invention is to provide a body construction including a floor of relatively light gauge sheet metal reinforced by a corrugated plate. The corrugations of the plate extend transversely of the body to form a multiplicity of closely spaced cross members, and there are longitudinal reinforcing members secured to the lowermost portions of the corrugations.

A further object of the invention is to provide a construction as above described wherein the corrugations may be strengthened, where required, by means of wooden inserts snugly fitting within the corrugations.

A still further object of the invention is to provide a body and sub-frame construction wherein bearing plates of special shape for the lifting arm trunnions are secured in a novel manner to the corrugated sub-frame so as to provide maximum strength at the point where lifting pressure is applied to the sub-frame when the construction is used on a dump body.

With the above and other objects in view, the invention consists of the improved truck body and sub-frame construction, and all its parts and combinations as set forth in the claims, and all equivalents thereof.

In the accompanying drawings illustrating one complete embodiment of the preferred form of the invention, in which the same reference numerals designate the same parts in all of the views, Fig. 1 is a fragmentary perspective view showing a truck mounted dump body in tilted position;

Fig. 2 is a fragmentary view of the improved body and sub-frame, with parts broken away to show the floor in vertical longitudinal section;

Fig. 3 is a cross-sectional view taken on the line 3—3 of Fig. 2;

Fig. 4 is a side view of one of the special lifting arm trunnion bearing plates alone;

Fig. 5 is a fragmentary sectional view taken on line 5—5 of Fig. 2; and

Fig. 6 is a sectional view, on an enlarged scale, taken on the line 6—6 of Fig. 1.

Referring more particularly to the drawings, the motor truck is indicated generally by the numeral 8, and said truck includes a chassis 9. Suitably connected to the chassis is a hydraulic hoist unit 10 acting upon levers 11 and lifting arms 12 to control the raising and lowering of the improved body 13.

Referring to Figs. 2 and 3, the body includes a floor 14, formed of relatively light gauge sheet metal, side members 15 and 16, a forward end wall 17, rear posts 18, and a tail gate 19 supported by the posts 18.

The floor 14 is preferably of one-piece construction and is reinforced by a plate 20 formed with a plurality of transversely extending corrugations 21. The portions of the corrugated plate 20 which contact the bottom of the body are spot welded thereto as at 22 to produce a rigid construction wherein the corrugations 21 provide a multiplicity of closely spaced cross members beneath the floor 14.

Longitudinal channels 23 and 24, preferably formed of sheet metal, are provided with upper edge flanges 25 and 26. These flanges are spot welded to the lowermost portions of the corrugations 21 as at 27. At the extreme rear edge of the sub-frame there may be an additional transverse reinforcement 29 which extends below the lowermost portions of the corrugations 21. The rear ends of the longitudinal members 23 and 24 may be welded to the front of the cross member 29, as illustrated in Fig. 2, and there may be a strengthening member 30.

Special bearing plates 31 (see Fig. 4) having lower edge flanges 32, are provided to receive the lifting arm trunnions. These plates have their upper edges scalloped as at 33 to fit the corrugations of the corrugated plate 20 in the manner shown in Figs. 1 and 2. The center of each plate is formed with a trunnion receiving opening 34. The edges of the scallops 33 are welded to the corrugations 21, and there may be additional strengthening plates 35 having openings 36 which register with the openings 34. The edges of the flanges 32 of the outermost plates may be spot welded to the sides of the longitudinal members 23, as at 37.

If an unusually strong body bottom is required, wooden inserts 38, which are shaped to snugly fit within the corrugations 21, may be employed. The ends of the wooden inserts may be engaged by upwardly bent tabs 39 at the ends of the corrugations (see Fig. 5).

The side members 15 and 16 have upper edge flanges 45 and 46 and have outwardly directed lower edge flanges 47 and 48. The extreme edges of the portions 47 and 48 are bent downwardly again as at 49 and 50 and then inwardly as at 51 and 52. The rear corner posts 18 may be connected during manufacture with the side members. These corner posts are equipped in the usual manner to support the swingable tail gate 19.

During manufacture the floor and sub-frame, including the longitudinal members 23 and 24 and the bearing plates 31, may be completed as one unit. The side assemblies 15 and 16 form additional units, and the forward end wall 17 is a fourth part. These four parts, together with the disconnected tail gate 19, may be shipped in knocked down form for assembly at some distant point. The construction is such that this assembly may be performed quickly by inexperienced labor. The side assemblies 15 and 16 are bolted to the floor and sub-frame unit by rows of bolts 40 and 41 which extend through the corrugated plate 20, between the corrugations, through the floor 14, and through the side member flanges 47 and 48. The forward end wall 17 is bolted to the floor unit by bolts 42, see Figs. 1 and 6, and to the ends of the side members by bolts 43. The tail gate 19 may then be connected in the usual manner to the end posts 18. Hinge plates 44 carried near the rear ends of the longitudinal members 23 and 24 permit pivoting of the body to the chassis 9 of the truck 8. Then by connecting the upper ends of the lifting arms 12 to the bottom of the body by means of trunnions which extend through the trunnion openings 34 and 36 in the bearing plates 31, the assembly is completed.

Due to the novel reinforcement for the body floor, including the multiplicity of closely spaced cross corrugations, the above described bolted assembly is made practical. With ordinary body and sub-frame constructions a similarly bolted arrangement would not possess sufficient strength for many types of use.

It is also apparent that the arrangement permits the use of relatively light gauge metal for the body floor, without danger of sagging, because of the closely spaced transverse corrugations. The body floor can be formed of metal of approximately half the thickness heretofore considered necessary. Inasmuch as the entire construction is of sheet metal, there is a great saving in over-all weight while providing a body of increased strength and rigidity. The manufacture of the floor and sub-frame is relatively simple because the construction makes it easy to spot weld at all points of contact.

Although only one form of the invention has been shown and described, various changes and modifications may be made without departing from the spirit of the invention, and all of such changes are contemplated as may come within the scope of the claims.

What we claim is:

1. In a vehicle body having a floor, a sheet metal plate formed with corrugations secured to the lower side of said floor, with the corrugations extending transversely of the floor, and apertured longitudinally extending bearing plates having upper edges scalloped to fit the corrugations of the corrugated plate and rigidly secured to the latter and having portions depending below the corrugated plate, the extreme upper edges of the scalloped portions contacting the metal plate between corrugations and the side and bottom edges of the scalloped portions contacting the sides and bottoms of the corrugations throughout the length of each bearing plate.

2. In a vehicle body having a floor, a sheet metal plate formed with corrugations secured to the lower side of said floor, with the corrugations extending transversely of the floor, apertured longitudinally extending bearing plates having upper edges scalloped to fit the corrugations of the corrugated plate and having portions depending below the corrugated plate, the extreme upper edges of the scalloped portions contacting the metal plate between corrugations and the side and bottom edges of the scalloped portions contacting the sides and bottoms of the corrugations throughout the length of each bearing plate, and welding securing said contacting scalloped edges to the corrugated plate.

3. In a vehicle body having a floor, a sheet metal plate formed with corrugations secured to the lower side of said floor, with the corrugations extending transversely of the floor, at least one longitudinal frame member secured beneath said corrugated plate, and apertured longitudinally extending bearing plates having upper edges scalloped to fit the corrugations of the corrugated plate secured to the latter and having portions depending below the corrugated plate, at least one of the bearing plates having a flanged laterally projecting lower edge which is braced against and secured to the side of a longitudinal frame member below the bottoms of the corrugations.

4. In a vehicle body having a floor, a sheet metal corrugated plate having a multiplicity of relatively closely spaced depending transversely extending channels secured to the lower side of said floor, said channels being separated by intervening plate portions which are in contact with the lower surface of the body floor, means for securing said intervening plate portions to said body floor, elongated reinforcing members of relatively light weight material having a cross-sectional shape to snugly fit the cross-sectional shape of the depending channels located within said channels and in contact with the lower surface of the body floor, and tabs at the ends of the channels bent upwardly from the bottoms of the channels for holding said reinforcing members against longitudinal displacement.

5. In a vehicle body having a floor, a sheet metal plate formed with corrugations secured to the lower side of said floor, with the corrugations extending transversely of the floor, longitudinally extending bearing plates each having its upper edge formed with alternating projections and recesses fitting the corrugations of the corrugated plate, said bearing plates being rigidly secured in position and each plate having a trunnion receiving hole in one of the upper edge projections, the holes in the bearing plates being positioned in the transverse space between a pair of corrugations of the corrugated metal plate.

6. In a vehicle body having a floor, a sheet metal plate formed with corrugations secured to the lower side of said floor with the corrugations extending transversely of the floor, transversely spaced longitudinally extending frame members secured beneath said corrugated plate, two pairs of apertured longitudinally extending bearing plates having upper edges scalloped to fit the corrugations of the corrugated plate secured to the latter between the longitudinally extending frame members and having portions depending below the corrugated plate, one of the bearing plates of one pair having a portion braced against one of the longitudinal frame members, and one of the bearing plates of the other pair having a portion braced against the other longitudinal frame member.

7. In a vehicle body having a floor, a sheet metal plate formed with corrugations secured to the lower side of said floor with the corrugations extending transversely of the floor, transversely spaced longitudinally extending frame members secured beneath said corrugated plate, two pairs of apertured longitudinally extending bearing plates having upper edges scalloped to fit the corrugations of the corrugated plate secured to the latter between the longitudinally extending frame members and having portions depending below the corrugated plate, one of the bearing plates of one pair having a flanged laterally projecting lower edge which is braced against and secured to the side of one of the longitudinal frame members, and one of the bearing plates of the other pair having a flanged laterally projecting lower edge which is braced against and secured to the side of the other longitudinal frame member.

8. In a vehicle body having a floor, a sheet metal plate formed with corrugations secured to the lower side of said floor, with the corrugations extending transversely of the floor, longitudinally extending bearing plates having upper edges scalloped to fit the corrugations of the corrugated plate secured to the latter and having portions depending below the corrugated plate, said bearing plates having laterally flanged lower edges, a strengthening place for each bearing plate having a scalloped upper edge positioned against the side of the bearing plate and above the lateral flange thereof, the bearing plates and strengthening plates having registering trunnion holes.

9. In a vehicle body having a floor, a sheet metal plate formed with ribs secured to the lower side of said floor, bearing plates extended transversely of said ribs with each having its upper edge formed with alternating projections and recesses fitting said ribs, said bearing plates being rigidly secured in position and each having a trunnion receiving opening in one of its upper edge projections, the openings in the bearing plates being positioned in the space between a pair of ribs.

ARNOLD F. MEYER.
HENRY C. FRENCH.